Sept. 19, 1961

H. L. GLICK 3,001,072

DEVICE FOR METERING NEUTRONIC
FLUX, TEMPERATURE, AND
COOLANT FLOW RATE

Filed June 20, 1958

WITNESSES:
Bernard R. Gieguey
James F. Young

INVENTOR
Harvey L. Glick

BY
Donald D. Smith
ATTORNEY

3,001,072
Patented Sept. 19, 1961

3,001,072
DEVICE FOR METERING NEUTRONIC FLUX, TEMPERATURE, AND COOLANT FLOW RATE
Harvey L. Glick, Pittsburgh, Pa., assignor, by mesne assignments, to the United States of America as represented by the United States Atomic Energy Commission
Filed June 20, 1958, Ser. No. 743,271
7 Claims. (Cl. 250—83.1)

The present invention relates to a neutron responsive device and particularly to such a device which will indicate neutronic flux density and coolant flow relative to a high temperature source of neutrons for use in connection with the control or operation of the source.

The neutrons emitted from the source of the character described usually include a porportion of slow or thermal neutrons, that is to say, neutrons having velocities in the neighborhood of 2,500 meters per second. These thermal neutrons usually form a rather definite proportion of the entire neutronic flux associated with the source, and therefore, their measurement gives an indication of the entire neutronic output of the source. The metering device of the invention employs a material capable of reacting with thermal neutrons to produce sensible heat. The heat resulting from the reaction between the aforesaid material and impinging neutrons is then related to the temperature of other components of the metering device in order to obtain a relationship which is equivalent to neutronic flux density. The temperatures associated with these components also yield the temperature of coolant employed for the neutronic source and contacting the metering device when the latter is inserted into the source. In addition, a relationship is obtained from the aforesaid temperatures which is proportional to the differential temperature drop across the laminar coolant film adjacent to the metering device and hence is proportional to the rate of flow of the coolant employed to cool the source.

The neutronic source may be a linear accelerator or the like which is cooled by a suitable cooling fluid such as water. A linear accelerator, as is well known, is utilized to accelerate hydrogen ions or protons to considerable velocities. The protons are then directed against a suitable target whence neutrons are emitted through nuclear reaction with the impinging protons.

From the foregoing brief description of the invention, it will be apparent that the metering device thereof can be employed to advantage in obtaining or monitoring the values of at least three characteristics, namely, a neutronic flux density, coolant temperature and temperature drop across the coolant film from which the rate of flow of the coolant can be obtained. The metering device, moreover, is adapted for use in relatively dense neutronic fluxes and at elevated temperatures without undergoing deterioration as a result of neutronic irradiation. The metering device also is adapted for use in areas of relatively high pressure due to the simplicity and relative strength of its component parts.

Before the present invention, it was usually necessary to employ a plurality of instruments for measuring those characteristics to which the metering device of the invention is sensitive. The use of these instruments necessitated usage of a plurality of instrument leads including both electrical wires or cables and flow tubing. In those applications wherein the sensing elements for conventional instrumentation were sealed within a vessel or container for the neutronic source, a complex sealing arrangement or, alternatively, a plurality of penetrational seals were required due to the large number of leads. Moreover, the requirement of both electric wires and flow tubing, or the like, complicated the sealing problems because differing types of seals were required for the electric leads and the flow tubing, respectively.

Moreover, due to their size and number, the aforementioned conventional instruments prohibited the measurement of more than one of these characteristics at a given point within or adjacent to the neutronic source. Moreover, the sizes of these conventional instruments not only interfered with normal coolant flow relative to the neutronic source but also prevented insertion of the latter-mentioned instruments in relatively small coolant channels.

It is, therefore, an object of the invention to produce a novel and efficient metering device capable of measuring simultaneously the characteristics of neutronic flux density, coolant temperature and rate of flow of coolant relative to a source of neutrons.

Another object of the invention is the provision of a device of the character described adapted particularly for use under conditions of elevated temperature and pressure.

A further object of the invention is the provision of a metering device as described previously which is sensitive to thermal neutrons.

Still another object of the invention is the provision of a metering device which is compact in structure and is readily insertable into relatively narrow coolant passages.

Another object of the invention is the provision of an improved metering device which is capable of measuring neutronic flux, coolant temperature and coolant flow or any one of these characteristics independently.

Additionally, it is an object of the invention to provide a metering device of the character described which can be permanently incorporated in the wall of a container or vessel associated with the neutronic source or in other components of the source.

In the course of the ensuing description of exemplary modifications of the invention, these and other objects, features and advantages thereof will be described with reference to the accompanying drawings, wherein.

Figure 1:
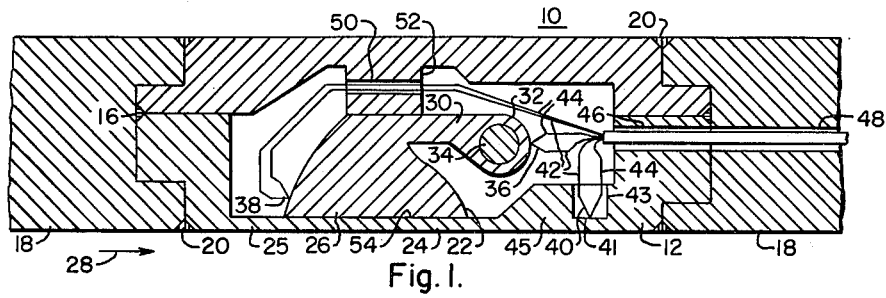
FIGURE 1 is a top plan view of one form of metering device according to the invention.
Figure 2:
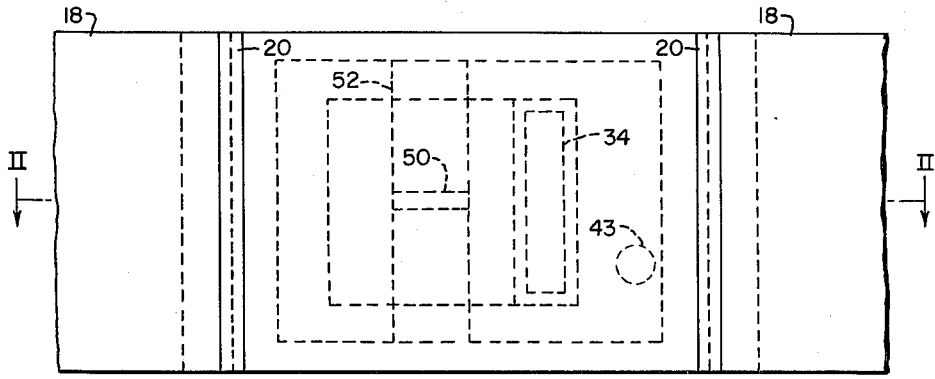
FIG. 2 is a longitudinally sectional view for the metering device shown in FIG. 1 and taken along reference line II—II thereof.

Referring now more particularly to FIGS. 1 and 2 of the drawings, the exemplary form of the invention shown therein comprises a bipartite casing 10 including a base member 12 and a cover 14. The cover 14 is joined to the base member 12 by means of a weld 16, which, if it is desired to hermetically seal the casing 10, can be extended completely around the periphery thereof. The casing 10 can be joined, if desired, to a relatively long probe, denoted generally by the reference character 18, for example, by means of welds 20. In this arrangement, the casing 10 is provided with the same cross-sectional configuration as that of the probe 18, and both the probe 18 and the casing 10 are made relatively small to enable them to be inserted into a relatively narrow coolant channel, or the like, in the aforementioned neutronic source.

The casing 10 is capable of retaining a gaseous filling, such as nitrogen or air, which desirably is maintained therein at a reduced pressure in order to minimize the transfer of heat therethrough to certain components of the metering device. Alternatively, the casing 10, when its components are joined as aforesaid, can be completely evacuated in accordance with known methods.

A heat conductive member 22 is mounted within the casing 10 upon a thin-walled section 24 of the base 12 thereof. The purpose of the thin-walled portion 24 is to reduce resistance to the flow of heat therethrough and, therefore, to promote the transfer of heat from the base 26 of the conductive member 22 to the coolant fluid, and vice versa, which is flowing more or less parallel to the outer surface of the casing 10 as denoted by flow arrow 28. The base portion 26 of the conductive member 22 is made relatively large and is bonded to the thin-walled section 24 so that a region of low temperature gradient is formed in the base portion 26 and the adjacent thin-walled section 24. The thin-walled section 24 extends beyond the base portion 26 so that the outer periphery surface 25 of the thin-walled section 24 serves to insulate thermally the conductive member 22 and the adjacent area of the thin-walled section 24. As a result, the heat flowing from the conductive member 22 must pass into the aforesaid coolant stream. In one arrangement of the invention, the casing 10 can be fabricated from stainless steel and the conductive member 22 from copper. In the latter case, the copper conductive member 22 is bonded to the thin-walled portion 24 by brazing or other well-known process.

The base portion 26 of the conductive member 22 is tapered upwardly as viewed in FIG. 1 and joins a relatively thin projection 30 which forms a high thermal gradient region of the conductive member 22. In this arrangement, the projection 30 is extended at a substantial angle to the base portion 26 in order to minimize the vertical thickness of the metering device, as viewed in FIG. 2 of the drawings. The projection 30 also is formed from a good heat conducting material, such as copper, and desirably is formed integrally with the base portion 26.

The projection 30 terminates at its outer extremity in a thickened section 32 in which is sealed a rod 34 formed from a fissionable material, such as uranium 235, uranium 233, plutonium 239 or pultonium 241. As better shown in FIG. 1 of the drawings, the rod 34 of fissionable material is completely encased in the thickened section 32 in order to reduce the hazard of handling components of the metering device during assembly thereof and also to minimize the thermal resistance to heat flow from the rod 34 to the projection 30, when this heat is generated within the conductive member 22 by disintegrating atoms of the fissionable rod 34 during operation of the invention.

As is well known, the material comprising the rod 34 will undergo fissioning when the metering device is exposed to thermal neutrons. The mass of the rod 34, of course, is much less than that required for a chain reaction or self-sustaining fission reaction and, therefore, the amount of fissioning which occurs in the rod 34 will be proportional to the external neutronic flux.

When fissioning occurs in the rod 34, the disintegration of the atoms so affected results in two approximately equal fissional fragments and in an average of approximately three neutrons. At least a portion of the knietic energies of the fissional fragments is dissipated in and generates heat in the rod 34 and in the adjacent material of the thickened section 32 of the conductive member 22. This heat is conducted less rapidly through the relatively thin projection 30 but more rapidly through the relatively thick base 26 of the conductive member 22. The total flow of heat through the conductive member 22, however, is proportional to the number of fissions occurring in the fissionable rod 34 which, in turn, is proportional as aforesaid to the neutronic flux density in the area of the metering device.

Alternatively, a material such as the boron 10 isotope can be substituted for the aforementioned fissionable material in the formation of the rod 34. The boron 10 atoms react with impinging thermal neutrons, as is well known, to yield short-range alpha particles. The energies of these particles then are dissipated in the material of the conductive member 22 disposed immediately adjacent the rod 34. The aforementioned alpha radiation, therefore, generates heat in the outer end of the projection 30 which is transmitted through the conductive member as explained previously. The amount of heat induced by alpha radiation, of course, is proportional to the density of the impinging neutrons.

A pair of thermocouples 36 and 38 are mounted with their hot junctions in heat conductive relation to the outer extremity of the thickened section 32 and to the base portion 26 of the heat conductive member. When so mounted, the thermocouple 36 is disposed adjacent the fissionable rod 34 while the thermocouple 38 is in proximity to the thin-walled section 24 of the casing 10. A third thermocouple 40 is mounted with its hot junction in contact with the bottom wall portion 41 of a cavity 43 at a point removed from the conductive member 22. The cavity 43, as better shown in FIG. 1 of the drawings, is formed in a thickened wall portion 45 of the base member 12. Due to the relatively small area of the bottom wall 41 of the cavity, the bottom wall can be made thinner than the aforesaid thin-walled portion 24 in order that the temperature indicated by the thermocouple 40 approximates that of the coolant, for reasons herein apparent.

All of the thermocouples are mounted in a conventional manner relative to the respective components of the metering device, and hence the constructional details of the thermocouples need not be elaborated upon. Suffice it to say, however, that the thermocouples 36, 38 and 40 may be magnesium oxide insulated, chromel-alumel, stainless steel sheathed and silver soldered to the respective inner components of the metering device. The electric leads 42 and 44 of each thermocouple are brought out through apertures 46 and 48 formed respectively in the casing 10 and in the probe 18. The apertures 46 and 48, of course, communicate with each other, and the electric leads 42 and 44 can be hermetically sealed within the casing aperture 46 by known means. The leads 42 and 44 are connected respectively to suitable conventional external circuitry (not shown) for converting the electrical outputs of the associated thermocouples into temperature indications.

For convenience, the electrical leads 42 and 44 of the thermocouple 38 are passed through an aperture 50 of a strengthening tab 52 formed on the inner surface of the casing cover 14. When the metering device is assembled, the strengthening tab 52 engages the upper surface, as viewed in FIG. 2 of the drawings of the conductive member 22. The bearing contact between the tab 52 and the conductive member 22 enables the latter with the aid of the cover 14 to support the relatively thin-walled section 24 of the casing 10. In furtherance of this purpose, the cover 14 is made relatively thick to provide the necessary strength. As better shown in FIG. 1 of the drawings, the tab 52 is relatively small in area, and, therefore, comparatively little of the heat generated by the fissionable rod 34 is diverted through the tab 52 from the conductive member 22. The tab 52 desirably, of course, is not brazed or bonded to the conductive member 22.

It will be appreciated that the metering device illustrated in FIGS. 1 and 2 can be embedded in the inner wall portion of a vessel or container for the aforementioned neutronic source or in other components thereof. In the latter arrangement, the leads 42 and 44 can be brought out through a suitable aperture (not shown) formed, for example, in the cover 14 of the casing 10, and the thin casing section 24 can be disposed at the inner periphery of the vessel so that neutronic flux coolant temperature and coolant flow rate adjacent the inner periphery of the vessel can be measured if desired.

In the operation of the metering device according to the present understanding of the invention, a temperature difference is recorded by the thermocouples 36 and 38 which is proportional as aforesaid to the number of fissions occurring in the fissionable material 34, or to the number of alpha emissions, if an alpha-emitter is substituted. Since virtually all of the heat generated in the adjacent portions of the conductive member 22 is conducted from the rod 34 to the junction 54 between the conductive member 22 and the thin-walled casing section 24, the resulting temperature difference between these components is proportional to the heat evolved by the fissional process and hence to the density of impinging neutrons. The difference in output of the thermocouples 36 and 38 can be calibrated to read directly, therefore, the neutronic flux density.

Because of the relatively large mass of the conductive member 22, it is not essential that the interior of the casing 10 be evacuated in order to minimize the heat conducted therefrom by convection. By the same token, the heat emitted from the conductive member 22 by thermal radiation likewise is insignificant. Because of the relatively thick base 26 of the conductive member 22, the location of the thermocouple 38 is not critical due to the resulting low temperature gradient in this region.

The thermocouple 40 on the other hand is disposed very near to the outer surface of the metering device and thus yields the temperature of the coolant flowing relative thereto as denoted by the flow arrow 28. The signal generated by the latter thermocouple 40 is proportional then to the bulk temperature of the coolant in the area of the metering device.

As is readily apparent, there is also a temperature difference between the points at which the thermocouples 38 and 40 are located, and this temperature difference is due to two causes. Firstly, there is a gradient between the point at which the thermocouple 38 is located near the junction of the conductive member 22 and the adjacent outer surface of the casing 10. However, this temperature gradient is negligible due to the large area involved and associated particularly with the junction 54. Secondly, there is a temperature drop between the conductive member-casing junction 54 and the cavity 43 in which the thermocouple 40 is located determined by the lower heat conducting ability of the material comprising the casing 10. The heat flowing between these latter areas, however, is controlled by the heat supplied or extracted by the coolant fluid. The transfer of heat between the coolant fluid and the metering device is determined by the laminar or boundary film of the coolant at the outer surface of the metering device. However, the thickness of this film and the differential temperature thereacross is related to the rate of flow of the coolant.

Since the bulk temperature of the coolant is measured by the thermocouple 40 and since the heat produced by the fissionable material is measured by the temperature gradient between the thermocouples 36 and 38, all quantities needed for calculating the film coefficient of the coolant are known. Furthermore, a relationship between flow velocity, or mass flow, and film coefficient is known from correlations based on a great mass of experimental data. Such correlations show that the film coefficients vary as the mass flow of the coolant raised to some known exponential power.

A method of calculating thermal neutronic flux and the mass flow rate of the coolant associated with the aforesaid neutronic source by means of the invention is as follows:

The mathematical expression for thermal neutron flux is:

$$\phi = \frac{CAK(T_{36} - T_{38})}{\Sigma_f \Delta X V}$$

where:
$\phi$ = thermal neutron flux, neutrons/cm.$^2$-sec.
$A$ = cross-sectional area of heat conducting member, ft.$^2$
$V$ = volume of rod of fissionable material
$K$ = thermal conductivity of heat conducting member, B.t.u./hr.-ft.$^2$-° F./ft.
$\Sigma_f$ = macroscopic fission cross section for fissionable material for neutrons, cm.$^{-1}$
$\Delta X$ = distance between thermocouples 36 and 38 corresponding to thermocouple 36
$T_{36}$ = temperature corresponding to thermocouple 36
$T_{38}$ = temperature corresponding to thermocouple 38
$C$ = a known constant. Approximately $$3 \times 10^{13} \frac{\text{fissions}}{\text{B.t.u.}}$$

The mathematical expression for the mass flow rate is:

$$G = \left[ \frac{C_1 K (T_{38} - T_{38})}{\Delta X (T_{38} - T_{40})} \right]^{1.25}$$

where:
$G$ = mass flow rate, lb./hr.-ft.$^2$
$K$ = thermal conductivity of bulk water, B.t.u./ft.$^2$ hr.-° F./ft.
$T_{40}$ = temperature corresponding to the thermocouple 40
$C_1$ = known constant The only unknown variables in the above equations are the temperatures. Thus, with the temperature readings given by the device of the invention, the thermal neutron flux and mass rate of the coolant are readily determinable. As will be apparent to one skilled in the art, the thermocouples may be connected to suitably calibrated instruments to indicate directly the neutron flux and coolant flow in response to the signals generated by the thermocouples. Likewise, the signals produced by the thermocouples may be used to energize electrical circuits designed to control the neutronic source and the coolant flow associated therewith in a known manner.

The metering device of this invention can be utilized in connection with any neutronic source which is cooled by a fluid medium irrespective of whether the fluid can be water, liquid metal or air. Obviously, it can be employed to measure neutronic flux wherever desired, without regard to the coolant flow. When the metering device is mounted in the wall of the containment vessel or in other components of the neutronic source, no pressure drop, such as that created by Pitot tubes, venturis, or the like, are produced by the metering device. As stated previously, the metering device, when employed within a sealed or pressurized container or vessel, requires only seals for electrical leads, although the device supplies a variety of information. The metering device, moreover is sufficiently compact and portable to enable it to be moved through various coolant passages of the neutronic source in order to measure appropriate characteristics of the source at various locations.

Figure 3:
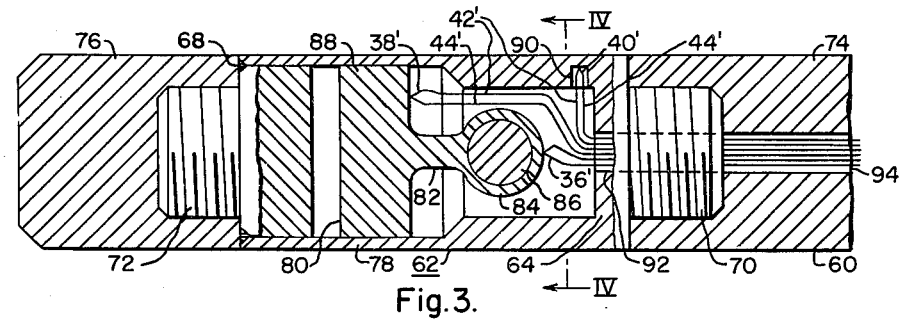
FIG. 3 is a partial longitudinally sectioned view of another form of metering device of the invention.
Figure 4:
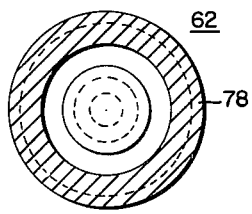
FIG. 4 is a cross-sectional view of the metering device of FIG. 3 and taken along reference line IV—IV thereof.

Referring now to FIGS. 3 and 4 of the drawings, another exemplary form of the invention is depicted therein. In the latter form, a metering device is adapted for incorporation within a rod-like probe or component 60 of the neutronic source. In this arrangement of this invention, as better shown in FIG. 4, a casing 62 is provided for the metering device which is substantially circular in cross section as is the probe or component 60. The casing 62 is closed at its ends, as viewed in FIG. 3 of the drawings, by means of an integral top wall section 64 and a bottom closure 66. The bottom closure can be hermetically sealed to the adjacent end of the casing 62 by means of an annular sealing weld 68 in order to maintain the desired atmosphere within the casing 62. The top wall 64 and the bottom closure 66 are each provided with a threaded stud 70 or 72, respectively, which are threaded into adjacent sections 74 and 76, respectively, of the probe or other component 60.

The casing 62 is provided with a thin-walled section 78 to which a conductive member 80 is bonded as described heretofore in connection with the conductive member 22 of FIGS. 1 and 2. In this arrangement, however, the conductive member 80 is substantially circular in cross section, as better shown in FIG. 4 of the drawings, and thus fits relatively closely within the thin-walled section 78 of the casing 62. The walls of the remaining portions of the casing 62, which are not supported by or adjacent to the conductive member 80, are made relatively thicker so that the metering device can be operated in regions of relatively high pressure.

Adjacent the center of the conductive member 80 an upstanding rod 82 is formed desirably integrally with the conductive member 80 and the free end thereof terminates in a relatively enlarged spheroidal portion 84. The rod 82 and the spheroidal portion 84 likewise are formed from a good conductive material, such as that noted heretofore. Enclosed within the spheroidal portion 84 is a generally spherical pellet 86 of a fissionable material. The character and function of the fissionable material 86 is generally the same as that described heretofore in connection with the rod 34 of FIGS. 1 and 2. Similarly it is contemplated that a short-range alpha emitter, such as that described above, can be substituted therefor. The material 86 desirably is completely enclosed within the spheroidal end 84 of the rod 82. The function of the conductive member 80, including the rod 82, likewise is similar to the conductive member 22 of FIGS. 1 and 2 with the rod 82 forming a high temperature gradient region and the circular base member 88, a low temperature gradient region of the conductive member 80.

A pair of thermocouples 36' and 38' are applied respectively to the outermost portion or spheroidal end of the rod 82 and to the base member 88 of the conductive member 80. A third thermocouple 40' is inserted into a cavity 90 formed in the thickened cylindrical wall portion of the metering device at a point removed from the conductive member 80. The leads 42' and 44' of each thermocouple are brought out through an aperture 92 in the top wall portion 64 of the casing 62, which aperture communicates with another aperture 94 extending longitudinally through the probe 60. Obviously, however, the electrical leads 42' and 44' can be brought out through some other portion of the casing 62.

The thermocouples 36', 38' and 40' are similar in structure and in operation to the thermocouples 36, 38 and 40 described previously in connection with FIGS. 1 and 2 of the drawings. In this example, then, the temperatures and temperature differences indicated by the thermocouples 36', 38' and 40' can be employed to ascertain neutronic flux-density, coolant temperature, and coolant flow rate as described in connection with the thermocouples 36, 38 and 40 associated with the metering device of FIGS. 1 and 2 of the drawings.

From the foregoing, it will be seen that novel and efficient forms of a metering device constructed in accordance with the invention have been disclosed herein. It is intended that the accompanying descriptive materials be employed for purposes of exemplifying the invention and should not be interpreted as limitative thereof.

Accordingly, numerous embodiments of the invention will occur to those skilled in the art without departing from the spirit and scope of the invention. It is to be understood, moreover, that certain features of the invention can be employed without a corresponding use of other features.

Therefore, what is claimed as new is:

1. A neutron-sensitive device comprising a housing capable of maintaining a vacuum therein, heat-conductive means mounted within said housing having relatively thin and thick sections which constitute regions of high and low temperature gradients respectively, a material capable of producing heat upon impingement of neutrons coupled in heat-conductive relationship to said high gradient region at a place remote from said low gradient region, said housing having a relatively thin wall portion to facilitate the transfer of heat therethrough, said low gradient region being mounted in heat-conductive relation to said thin wall portion whereby a relatively low temperature gradient is maintained between said low gradient region and the outer surface of said thin wall portion, and temperature-sensing means for measuring the differential temperature between a point in said high gradient region adjacent said material and a point in said low gradient region, said temperature difference being proportional to the neutronic flux in the region in which said device is placed.

2. A neutron-sensitive device comprising a housing capable of maintaining a vacuum therein, heat-conductive means mounted within said housing and having relatively thin and thick sections which constitute regions of high and low temperature gradients respectively, a material capable of producing heat upon impingement of neutrons coupled in heat-conductive relationship to said high gadient region at a place remote from said low gradient region, said housing having a relatively thin wall portion to facilitate the transfer of heat therethrough, said low gradient region being mounted in heat-conductive relation to said thin wall portion whereby a relatively low temperature gradient is maintained between said low gradient region and the outer surface of said thin wall portion, a first temperature sensing device coupled to said high gradient region adjacent said material, a second temperature sensing device coupled to said low gradient region, the temperature difference indicated by said first and said second temperature sensing devices being proportional to the neutronic flux of the area in which said neutron-sensitive device is placed, the temperature of said second temperature sensing device being equivalent to the bulk temperature of a heat-exchanging medium flowing exteriorly of said housing when said flux is substantially constant.

3. A neutron-sensitive device comprising a heat-conductive means having relatively thin and thick sections which constitute regions of high and low temperature gradients respectively, a mass of material capable of generating heat upon impingement of neutrons coupled in heat-conductive relation to said high temperature gradient region at a phase remote from said low temperature gradient region, means for measuring the temperature difference between a point in said high gradient region adjacent said material and a point in said low gradient region, said temperature difference being proportional to the neutronic flux in the region in which the device is placed, and additional temperature sensing means for measuring the temperature difference between said low gradient region and a point removed from said heat conductive means for the purpose of determining the mass flow rate of a heat transfer medium in the area of said device.

4. A neutron-sensitive device comprising heat-conductive means having relatively thin and thick sections which constitute regions of high and low temperature gradients respectively, a mass of material capable of emitting heat upon impingement of neutrons coupled to said high gradient region at a place remote from said low gradient region, first and second thermocouples coupled respectively to said high and said low gradient regions, a third thermocouple mounted at a point removed from said heat-conductive means for indicating the temperature of a heat transfer medium in the area of said device, circuit means for connecting said thermocouples to external metering circuitry for measuring the temperature difference between said high and said low gradient regions and between said low gradient region and said point, said first temperature difference being proportional to the neutronic flux in the area of said device, said second-mentioned difference being proportional to the mass flow rate of said heat transfer medium.

5. A neutron-sensitive device comprising a housing capable of maintaining a vacuum therein, a heat-conductive member having relatively thin and thick sections which constitute high and low temperature gradient regions respectively, said low gradient region being coupled in heat transfer relation to a wall of said housing, a mass of material capable of producing heat upon impingement of neutrons, said material being coupled to said high gradient region, and means for measuring the temperature difference between a point in said high gradient region adjacent said material and said low gradient region, said temperature difference being proportional to the neutronic flux in the area of said device, and additional means for measuring the temperature difference between said low gradient region and a point on said housing removed from said heat-conductive member for the purpose of determining the flow rate of a heat transfer medium adjacent the outer surface of said housing.

6. A neutron sensitive device as recited in claim 1 wherein the heat producing material is selected from the group consisting of those isotopes which are fissionable upon interaction with neutrons and those isotopes which yield short-range alpha particles upon interaction with neutrons.

7. A neutron sensitive device according to claim 3 wherein said mass of material is selected from the group consisting of $U^{233}$, $U^{235}$, $Pu^{239}$, $Pu^{241}$, and $B^{10}$.

References Cited in the file of this patent

UNITED STATES PATENTS

| 2,413,128 | Wills | Dec. 24, 1946 |
| 2,677,772 | Moon | May 4, 1954 |
| 2,811,856 | Harrison | Nov. 5, 1957 |
| 2,814,731 | Werme | Nov. 26, 1957 |
| 2,824,971 | Weeks | Feb. 25, 1958 |
| 2,856,341 | Kanne | Oct. 14, 1958 |